Patented May 6, 1952

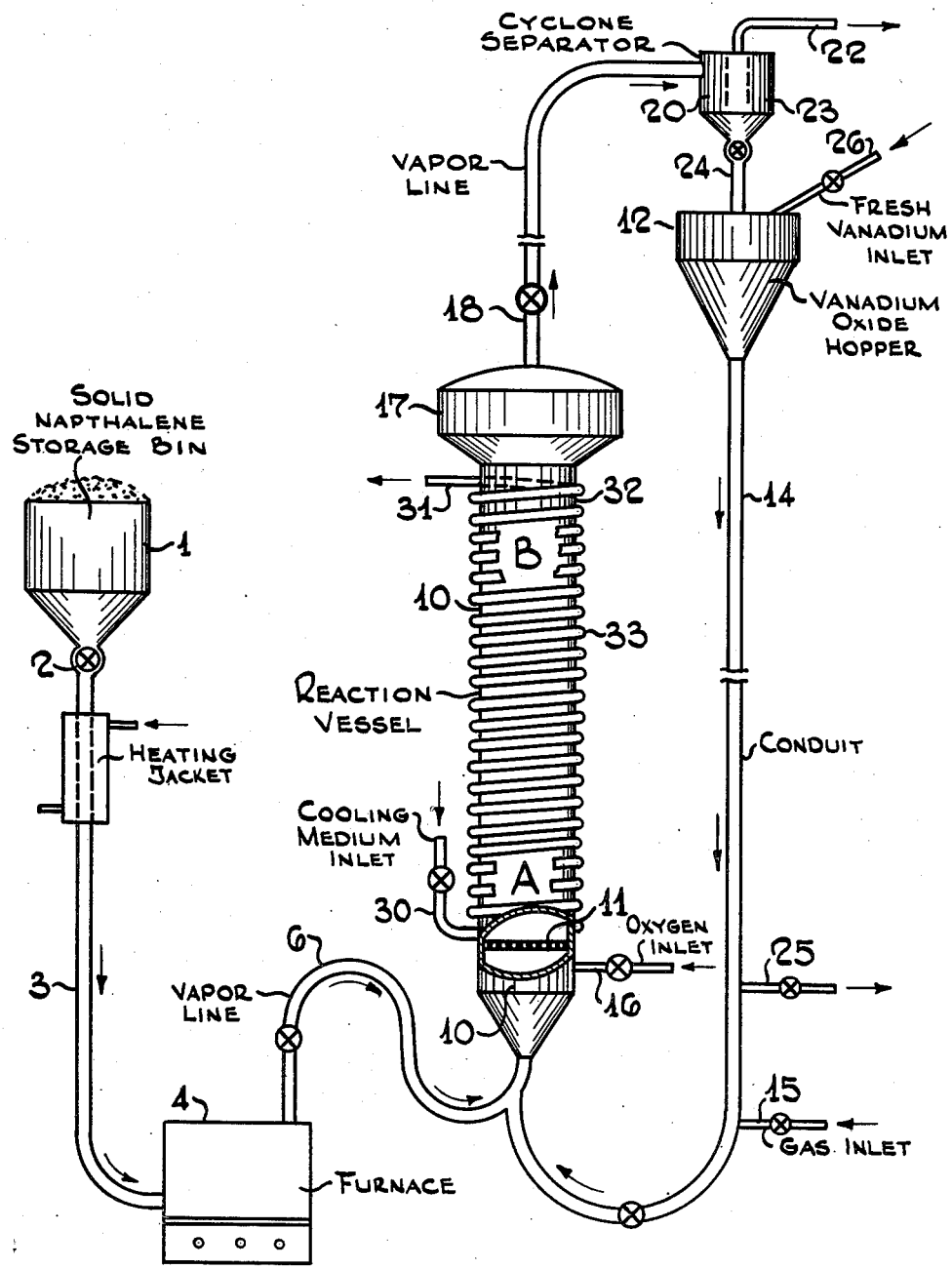

2,595,254

UNITED STATES PATENT OFFICE 2,595,254

APPARATUS AND PROCESS FOR CIRCULATING POWDERED SOLID IN CHEMICAL TREATMENT

Charles E. Hemminger, Westfield, N. J., assignor to Standard Oil Development Company, a corporation of Delaware Original application June 19, 1941, Serial No. 398,737. Divided and this application September 8, 1944, Serial No. 553,199

2 Claims. (Cl. 23—1)

The present application is a division of my copending application Serial No. 398,737, filed June 19, 1941, and now abandoned.

The present invention relates to a method of controlling temperatures during catalytic and non-catalytic reactions and, more particularly, it relates to controlling the temperatures of chemical reactions carried out in the gas phase by maintaining within the reaction zone a solid material in powdered form, which material may be catalytic or non-catalytic. Stated otherwise, the present invention relates to improvements in the art of controlling vapor phase chemical reactions by maintaining within the reactor at all times a body of catalyst which does not require removal for regeneration, or maintaining a body of material which is non-catalytic in the reaction taking place in said reactor. The main body of catalyst is not withdrawn from the reactor except as to that portion of fines which unavoidably becomes entrained in the vapors leaving the reactor.

As is generally known, there are a great many reactions which are carried out in the vapor phase, such as the oxidation of naphthalene to form phthalic anhydride, the oxidation of ammonia to form nitric acid, the oxidation of CO to $CO_2$, the chlorination of hydrogen to form hydrochloric acid, the oxidation of $SO_2$ to $SO_3$, and numerous others, in which the maintenance of the reaction within a certain temperature range is important from the standpoint of yields and for other purposes. In the oxidation of $SO_2$ to $SO_3$, the reaction has a critical temperature range within which the equilibrium is such that maximum amounts of $SO_3$ are produced. We may say, therefore, that in vapor phase reactions generally, it is desirable to control the temperature during the reaction to prevent run-away conditions or explosions, to suppress side reactions, to increase the yield of desired products, to protect heat sensitive catalysts, and for many other similar or related ends.

Of course, prior to my invention many research workers had controlled the temperature conditions in a reaction zone within a desired range by causing a fluid medium such as mercury, molten lead, molten salts, and the like, to circulate through or in close proximity to the reaction, to either add or abstract heat from the products undergoing reaction in order to maintain reaction substantially within some desired temperature range. The use of heat exchangers through which a temperature controlling fluid of some sort circulates undoubtedly effects the desired result. However, the use of heat exchangers, particularly within a reaction zone where, after all, it is usually more effective, since the tubes must be closely spaced because usually the catalyst is a poor heat conductor, involves ordinarily a large installation cost and if the particular reaction produces products which are corrosive in nature or, in fact, if the reactants generally are corrosive, the heat exchanger which usually is constructed of some sort of a metal undergoes rather rapid deterioration due to corrosion, or very expensive corrosion resistant metals are required. Furthermore, the heat exchanging suface must be extensive in reactions taking place at high temperatures to effect the desired control.

My present process, as indicated, relates to a method in which the temperature of a given reaction taking place in the vapor phase may be controlled by maintaining a subdivided or powdered material within the reaction zone where it contacts the vapors in the reaction zone but, for the most part, is not removed from the reaction zone or, in other words, a body of catalyst or powdered material is maintained in suspension in the vapors while the vapors themselves pass through the reaction zone and are withdrawn therefrom substantially free of the powdered material, except for fines which are unavoidably entrained in the vapors issuing from the said zone. This material may be inert to the reactants and non-catalytic in its action but, on the other hand, it may be catalytic and if it is, it is a catalyst which is not poisoned by the reaction which it serves to catalyze and hence does not require regeneration.

Speaking generally, the present invention relates to a process in which gaseous reactants are contacted with a powdered material in the reaction zone under conditions such that the reactants flow upwardly and also maintain in suspension, a solid in powdered form which powder acts as a heat absorbing or releasing medium and thus tends to maintain the reactants within some given desired temperature range which is optimum for the reaction in question.

My present process will be best understood by setting forth a specific example, and the same is now given below, with the understanding that the same example is purely illustrative. To further explain my invention, I have submitted herewith a drawing setting forth diagrammatically a flow plan illustrating a specific embodiment of my invention.

Referring in detail to the drawing, I shall illustrate a process of oxidizing naphthalene to form phthalic anhydride in the vapor phase employing powdered vanadium oxide both as to the heat transfer and the catalyst. As is generally known, the oxidation of naphthalene to phthalic anhydride is exothermic in nature, and consequently, the catalyst serves in the reaction proper to control the heat of the reaction and, at the same time, serves as a catalyst.

Solid naphthalene is withdrawn from a storage bin 1 through star feeder 2 into pipe 3 where it is melted and thereafter discharged preferably into a furnace 4 where it is vaporized. The naphthalene vapors are withdrawn from the furnace through line 6 and thence discharged into an elongated reaction vessel 10 containing grid 11 at the bottom to give distribution of the gases. Meanwhile, in order to initiate operations, vanadium oxide in the form of a powder having a particle size of about 200 to 400 mesh is withdrawn from storage hopper 12 through an elongated pipe 14, the lower extremity of which discharges into the naphthalene conduit 6 at a point just below the projection of pipe 6 into the bottom of reactor 10. The hopper 12 is elevated considerably above reactor 10. For example, the vertical length of pipe 14 may be of the order of 75 ft. so that considerable static pressure is developed at the lower end of pipe 14. Gases such as nitrogen, air or steam are introduced through line 15 into pipe 14 to keep the powder in 14 in an aerated condition. This pressure is sufficient to prevent the flow of naphthalene vapors into pipe 14 in any substantial amounts. The pressure of the naphthalene vapors in line 6 is sufficient to overcome the pressure drop in reactor 10 and through subsequent accessory apparatus wherein the phthalic anhydride is condensed and recovered.

As will hereinafter more fully appear, the lower portion of reactor 10 serves as a preheating zone for the naphthalene, the preheat being derived from hot vanadium oxide. Oxygen or air, which may be diluted by other gases, necessary for the reaction is discharged into the reactor 10 through a conduit 16 and this also passes upwardly and concurrently with the naphthalene vapors and the vanadium oxide powder, whereupon the naphthalene is oxidized to produce phthalic anhydride, benzoic acid, naphthaquinone, and other oxidation products. The temperature and pressure conditions most favorable for the above oxidations are well known to the art and do not per se constitute my present invention. The linear velocity of the naphthalene vapors and the air or oxygen in reactor 10 are such as to cause the formation of a suspension of vanadium oxide in the reactor having an average density of 5 to 36 lbs./cu. ft. measured under temperature conditions prevailing in the reactor, the concentration depending on the velocity in the vessel. Under these conditions the progress of both the vanadium oxide and the vapors is generally upward from region (A) towards region (B) and the linear velocity of the vapors is substantially greater than that of the vanadium oxide, so that there is a "slippage" of the vanadium oxide with respect to the vapors. However, part of the vanadium oxide eventually reaches the upper portion or header 17 which is of greater internal diameter than the lower portion. This upper portion 17 constitutes a separation zone where the velocity of the vapors is slowed down to the extent that substantially all of the vanadium oxide drops out of the vapors and returns to the lower portions of the reactor. Stated otherwise, there are eddy currents of the catalyst moving up and down in the reactor so that the hot catalyst in the top of the reactor and the part recovered from header 17 is moved down to the bottom of the reactor to preheat the incoming gases to the reaction temperatures. The vapors are then withdrawn through line 18 and conducted to a cyclone separator 20 or some other suitable device for separating solids from the gas, particularly finely divided particles, such as a Cottrell precipitator, a glass filter, or the like. The vapors substantially freed from vanadium oxide are withdrawn from separator 20 through line 22 and are then delivered to a recovery system (not shown) to recover desired products. Since, in the case of vanadium oxide, the same does not require regeneration to catalyze the oxidation of naphthalene, the catalyst separated from 20 may be delivered through star feeder 23 and conduit 24 to hopper 12 for reuse in the process, or it may be discarded from the system through line 25 if the particle size is too minute to handle, additional fresh vanadium oxide being fed through line 26 to hopper 12. The recycle catalyst also aids in uniform temperatures in the reactor.

Referring again to reactor 10, it is pointed out that the section represented by (A) may serve as a sort of preheating zone, that is to say, the temperature of the catalyst in this region is preferably somewhat above that of the incoming naphthalene vapors and air. Consequently, the catalyst may serve to transmit a portion of its heat to the naphthalene and the air. The thus superheated naphthalene as it passes upwardly in the reactor undergoes an oxidation which is exothermic in character and the reaction mixture acquires a maximum temperature in the region represented generally by (B). In this region the catalyst may serve to absorb at least a portion of the heat generated by the oxidation reaction and thus serve to temper the said reaction. In other words, the main body of the catalyst remains within the reactor circulating back and forth from top to bottom and serving not only to catalyze the oxidation of the naphthalene but also to control the temperature conditions prevailing therein. In order to have the desirable heat transfer in the reactor and to avoid side reactions in a vapor space in the top of the reactor it is a necessary part of this invention that the concentration of powder in the reactor be substantially uniform from the grid to the low velocity zone. For the size of powder mentioned, the velocity in the reactor must be less than 3 ft./second at the top of the bottom section (zones (A) and (B)) of the reactor, with about 1 to 1.5 ft./second at operating conditions the preferred range. With the powder having a free settling bulk density of 30 to 40 lbs./cu. ft., the concentration in the bottom reactor section, the higher velocity section, is preferably about 10 to 15 lbs./cu. ft., while the gases entering the low velocity section have a concentration of about 0.02 to 0.4 lbs./cu. ft. The bottom section has a uniform concentration of the aforementioned 10 to 15 lbs./cu. ft. from the grid to about 2 ft. from the top of this section. The velocity in section 17, when the height of 17 is about 1 ft., is about ¾ to ½ that in the lower section, so that the gases leaving have a concentration of less than 0.015 lbs./cu. ft. It is apparent from the foregoing that practically all of the reactor is filled with the powder material and little or none of the reaction takes place in a vapor space in the top of the reactor and most of the reaction is in the presence of powder of uniform and high concentration.

In using this reactor with many different reactions the difference in sensible heat between the incoming reactants and the products is sufficient to maintain the reaction temperature whether endothermic or exothermic. However, if the heat evolution is too great, the heat must be removed by other medium. This can be done by diluting one of the reactants with cool gases which may be recirculated, or by spraying into the reactor liquid reactants or extraneous liquid materials as water. While in the example liquid or solid naphthalene could be introduced into reactor 10 to aid in absorbing heat, it is preferred to remove the whole of the excess heat by an external heat exchange coil which consists of pipe 33 surrounding wall 32 of reactor 10, the cooling medium entering through line 30 and leaving through line 31. The heat transfer medium may be vaporizable liquids as water, mercury, oils, etc., or a molten salt. With the vaporizable liquids the temperature, of course, can be regulated over a range by varying the pressure on the vapors released through line 31. Obviously, in endothermic reactions where heat is supplied to the reactants the temperature of the heat transfer medium is higher than the reaction temperature. In the present case water is employed for cooling, and the heat is removed in steam. The amount of heat removal is controlled by the water in the coil, decreasing or increasing the evaporating surface. It is also possible to localize the heat removal by having the coil divided in separated sections, any one of which may be taken out of service to decrease the heat transfer surface. Of course, the heat transfer surface may be disposed in other forms, such as vertical tubes or an enclosing jacket. However, it is an important feature of the reactor that the temperature of the cooling medium is substantially lower than the reaction temperature and that the distances between the cooling surfaces may be over 1 inch because of the active mixing in the reactor of the solid particles and gases.

I have found that in the case of naphthalene oxidation, good results may be obtained by operating according to the following conditions:

Temperature of section (B) in reactor 10 _____°F__ 690
Average pressure prevailing in reactor 10 _____lbs./sq. in. gauge__ 3
Inlet temperature of naphthalene vapors _____°F__ 450
Inlet temperature of oxygen _____°F__ 100
Molar ratio of air to naphthalene vapors____ 30
Lbs. vanadium oxide in reactor per lb. naphthalene per hour _____lbs__ 1-10

It will be understood, however, that these details are purely illustrative and do not constitute a limitation of my invention.

Another modification of my invention resides in the concept of oxidizing $SO_2$ to $SO_3$. As is generally known, the oxidation of $SO_2$ to $SO_3$ takes place under optimum conditions within a somewhat restricted temperature range in which range vanadium oxide is most active as a catalyst. In other words, where conversions of over 90% $SO_2$ to $SO_3$ are obtainable vanadium oxide is at its maximum activity or, at least, in an effective catalyst. In the temperature range where iron oxide is most active as a catalyst for the reaction, the rate of dissociation of $SO_3$ to $SO_2$ is so rapid that the all-over conversion to $SO_3$ is substantially lower than at the optimum temperature range for this reaction. These facts are well known in the art of producing sulfuric acid by the contact process.

My improvements are applicable to the process of producing sulfuric acid anhydride by the oxidation of $SO_2$, for they provide means for maintaining the reaction within the optimum temperature range. Consequently $SO_2$ and oxygen discharged into reactor 10 may be controlled to maintain the oxidation within the desired temperature range by a method entirely analogous to that already explained in connection with the preceding description of my invention as applied to naphthalene oxidation.

It is a specific disclosure of this application that the recycle stream of powdered material in pipe 14 be introduced into one of the two reactants which is inactive or inert when mixed with the recycle material or at the temperature of the mixture. For example, in the example cited, it is desirable to maintain the vanadium oxide catalyst (usually designated as vanadian pentaoxide), as the catalytic material added but actually in another oxide form in the reactor, in a lower oxide form as a mixture of the several oxides possible in a reducing atmosphere. If the vanadium oxide were contacted with the oxygen, the higher oxides would form: then, in contact with the naphthalene there would be too great an oxidation of the naphthalene to undesirable products and partial deactivation of the catalyst.

A modification of the invention involves the recycle powder stream, which increases the recycle ratio in the reactor, and which is returned to the reactor above the distributor plate 11. In this case, the gases are mixed under the plate and an even distribution of uniformly mixed gases passes into the reactor proper before contacting the powder.

In order to obtain the highest concentration of powder in the reactor so that the maximum amount of heat transfer is obtained and there is a minimum of free space above the dense phase (A and B) in the high velocity section, it is necessary to change the velocity according to the free settling bulk density of the powder, the size of the powder and the viscosity of the gases under operating conditions. A broad preferred density range is from 10 to 20 lbs./cubic foot of material of less than 100 mesh, with free settling density of 40 lbs./cubic foot. As the free settling density increases the desirable density in the reactor increases in proportion, and if a lower concentration is desired, the velocity must be increased in inverse proportion. To have the maximum mixing, it is desirable to have a wide range of particle sizes in the fines range; thus, material having 11% from 100 to 300 mesh, 14% from 200 to 325 mesh, and 75% through 325 mesh is a desirable powder size. Fine powders of less than 20 micron size give a low density in the reactor but tend to give a higher powder level (top of dense phase) while a narrow cut, large size powder as between 20 and 40 mesh, gave a low overall concentration and a low level, although the concentration in the dense phase was higher. It is preferred that the average diameter of the largest 10% of particles is at least two times average the diameter of the smallest 10% of particles.

Regarding the viscosity of the gas at reacting conditions, the foregoing conditions apply to a viscosity of about 0.02 centipoises absolute viscosity. Low viscosities somewhat decrease the heights from the top of the concentrated powder to the top of the high velocity section but have a marked effect on the density therein. As the viscosity is halved the density increases about 25% and, consequently, for the same concentration the velocity must be increased by 25%. It is apparent that as the reactor is used with different powders and different gases, the reactor must be designed to give the desired concentration according to the trends indicated. However, the density and degree of "fullness" of the reactor is controlled by the amount of powdered material fed to the system; if more than the amounts for the foregoing equilibrium conditions are placed in the system, the powder passing overhead to the recovery equipment is increased. It is returned to the reactor by the recovery equipment and thus increases the density to the desired amount. At all times, it is preferred that the reactor is filled with powder which has a concentration of at least 5 to 7 lbs./cu. ft. and the reactor does not have more than 3 to 5 ft. of space from the top of this dense phase to the outlet of the reactor.

Under some operating conditions of low velocity and high concentrations in the reactor, the low velocity top section can be eliminated because the overhead loss at the low velocities will be negligible, but if not the catalyst can be returned from the recovery equipment.

Many modifications of my invention will suggest themselves to those familiar with the chemical arts. For example, my process is applicable to hydrogenation, oxidation, chlorination, nitration, isomerization, polymerization, cracking (e. g. those processes where very little or no coke is formed in the catalyst), desulfurization, and various reactions. In some of the above reactions, the process is carried out in the presence of a catalyst in reactor 10. For example, polymerization of olefins may be so carried out employing a phosphoric acid catalyst supported on kieselguhr. The process preferably is run until the catalyst becomes permanently inactive whereupon it is withdrawn from the system and a fresh supply of catalyst added. In this type of process, the operation may be run for days or even weeks, under proper conditions, without having to replace catalyst.

As regards the hydrogenation of hydrocarbons, I prefer to operate at temperatures of from 500° F. to 1000° F. while under pressures of from 5 to 500 atmospheres, employing catalyst such as nickel, molybdenum, tungsten and Group IV and VIII elements supported on activated clays. For example, I may hydrogenate olefins and diolefins under these conditions.

When my process is applied to the Fischer synthesis, I prefer to operate under pressures of from 1 to 10 atmospheres and at temperatures of from 300° F. to 500° F., and under these conditions I find I obtain from 20% to 40% conversion of the oxide of carbon to the hydrocarbon. In the hydrogenation of CO, I prefer to use 2 volumes of hydrogen to 1 of CO and to employ as a catalyst, cobalt on activated clays.

My process is also applicable to methanol synthesis from CO and hydrogen, employing these in equal molecular ratios, a mixture of copper and zinc oxides as catalyst, and pressures of from 100 to 300 atmospheres, and employing the temperatures customarily used in this synthesis.

My process is also applicable to the production of hydrogen from methane by oxidation employing copper oxide, nickel oxide and ferric oxide as the catalyst, and temperatures of from 1000° F. to 1600° F.

My process is also applicable to the oxidation of propane and ethane to their corresponding alcohols, employing 2% to 10% oxygen in the reaction mixture.

Another adaptation of my invention involves the cracking of propane and isobutane at temperatures of from 1000° F. to 1400° F., to yield the corresponding olefins in a process which is non-catalytic.

Another adaptation of my invention involves bauxite or copper treating of naphthas at temperatures within the range of from 500° F. to 900° F.

Another adaptation of my invention involves the synthesis of phosgene from carbon monoxide and chlorine at temperatures from 0° F. to 150° F., employing an activated charcoal in the reactor 10.

As hereinbefore indicated, my process is applicable to the production of $SO_3$ from $SO_2$ by oxidation, employing vanadium pentoxide and temperatures of from 800° F. to 1000° F.

My process is also applicable to the process of ammonia from oxides of nitrogen, employing temperatures of from 600° F. to 1000° F., or higher, such as temperatures up to 1800° F.

In chlorinating hydrocarbons according to my process, I prefer to use catalysts such as cupric chloride, aluminum chloride, charcoal, and ferric chloride at temperatures of from 100° C. to 200° C. Where I form hydrochloric acid from elements, I prefer to operate in the range of from 1000° F. to 1800° F. and to employ particles in reactor 10.

In nitrating benzene in vapor phase and toluene in the same physical state, I prefer to operate at around 100° C. in the case of benzene, and in the case of toluene at temperatures of from 0° C. to 100° C.

In the isomerization of normal butane and normal pentane, using aluminum chloride on activated clays, boron fluoride on activated chloride, or hydrogen fluoride as the catalyst in reactor 10, I obtain good results at temperatures of from 200° F. to 500° F., and pressures of from 75 to 350 lbs./square inch.

In polymerizing olefins with phosphoric acid on kieselguhr, I prefer to operate at temperatures of from 300° F. to 600° F. and at pressures of from 200 to 1500 lbs./square inch.

In cracking tri-isobutylene in the presence of acid treated clay, I prefer to operate at temperatures of from 100° F. to 500° F. and pressures of from 1 to 50 lbs./square inch, where the desired product is isobutylene.

I claim:

1. A continuous method for conducting a chemical treatment of a gasiform material with a powdered solid material, which comprises flowing fresh powdered solid material by gravity in an elongated confined stream to a bottom inlet of a vertically elongated cylindrical treating zone, admixing a stream of gasiform material with said powdered solid material passing into said inlet, forcing the resulting mixture of the gasiform and powdered solid material upwardly in the form of separated streams of short length into the treating zone to form a dense turbulent suspension of the powdered solid material in the gasiform material, said dense suspension having an upper level at the top of said treating zone, and being of uniform high concentration, passing gasiform material upwardly from the treating zone through a superimposed separation zone of greater diameter than the treating zone so that entrained powdered solid material except for a small amount of finer particles drops from the gasiform material and is returned directly down into the treating zone as the gasiform material passes through the separation zone at a reduced velocity, passing the gasiform material carrying the finer particles overhead from said separation zone into a second separation zone in which said finer particles are separated, and recirculating said finer particles thus separated by adding them to the fresh powdered material as it is fed into said elongated confined stream at a point elevated above said treating zone.

2. An apparatus for continuous chemical treatment of a gasiform material with a powdered solid material including the combination with a vertically elongated cylindrical treating case, of a feed hopper for powdered solid material disposed at a point elevated above the top of said treating case, a standpipe connecting a bottom outlet of said hopper to a bottom inlet of said treating case so that powdered solid material flows in an elongated confined stream by gravity through said standpipe from the hopper into the bottom inlet of the treating case, a conduit for supplying a stream of gasiform material to the bottom inlet of said treating case where the gasiform material thus supplied becomes admixed with the powdered solid material entering the treating case through said bottom inlet, a foraminous member disposed in said treating case near the bottom thereof but above the said inlet for distributing the mixture of gasiform and powdered solid material from said inlet as separated streams of short length forced upwardly into the treating case, a cylindrical separation chamber of greater internal diameter than said treating case superimposed upon said treating case so that powdered solid which drops out in said separation zone from gasiform material flowing therethrough at a reduced velocity from said treating case falls back into the treating case, a separator for separating entrained finer particles from the gasiform material, a conduit for withdrawing gasiform material overhead from said separation chamber into said separator for separating entrained finer particles above said hopper, means for discharging the separated finer particles from said separator into said feed hopper, and an inlet means for supplying fresh powdered solid material to said feed hopper.

CHARLES E. HEMMINGER.

REFERENCES CITED

The following references are of record in the file of this patent:

UNITED STATES PATENTS

| Number | Name | Date |
| --- | --- | --- |
| 1,674,589 | Caspari | June 19, 1928 |
| 1,873,783 | Osterstrom et al. | Aug. 23, 1932 |
| 2,020,431 | Osborne et al. | Nov. 12, 1935 |
| 2,311,564 | Munday | Feb. 16, 1943 |
| 2,357,901 | Lewis et al. | Sept. 12, 1944 |
| 2,360,787 | Murphree et al. | Oct. 17, 1944 |
| 2,425,754 | Murphree et al. | Aug. 19, 1947 |

FOREIGN PATENTS

| Number | Country | Date |
| --- | --- | --- |
| 513,947 | Great Britain | Oct. 26, 1939 |